April 12, 1927. 1,624,249

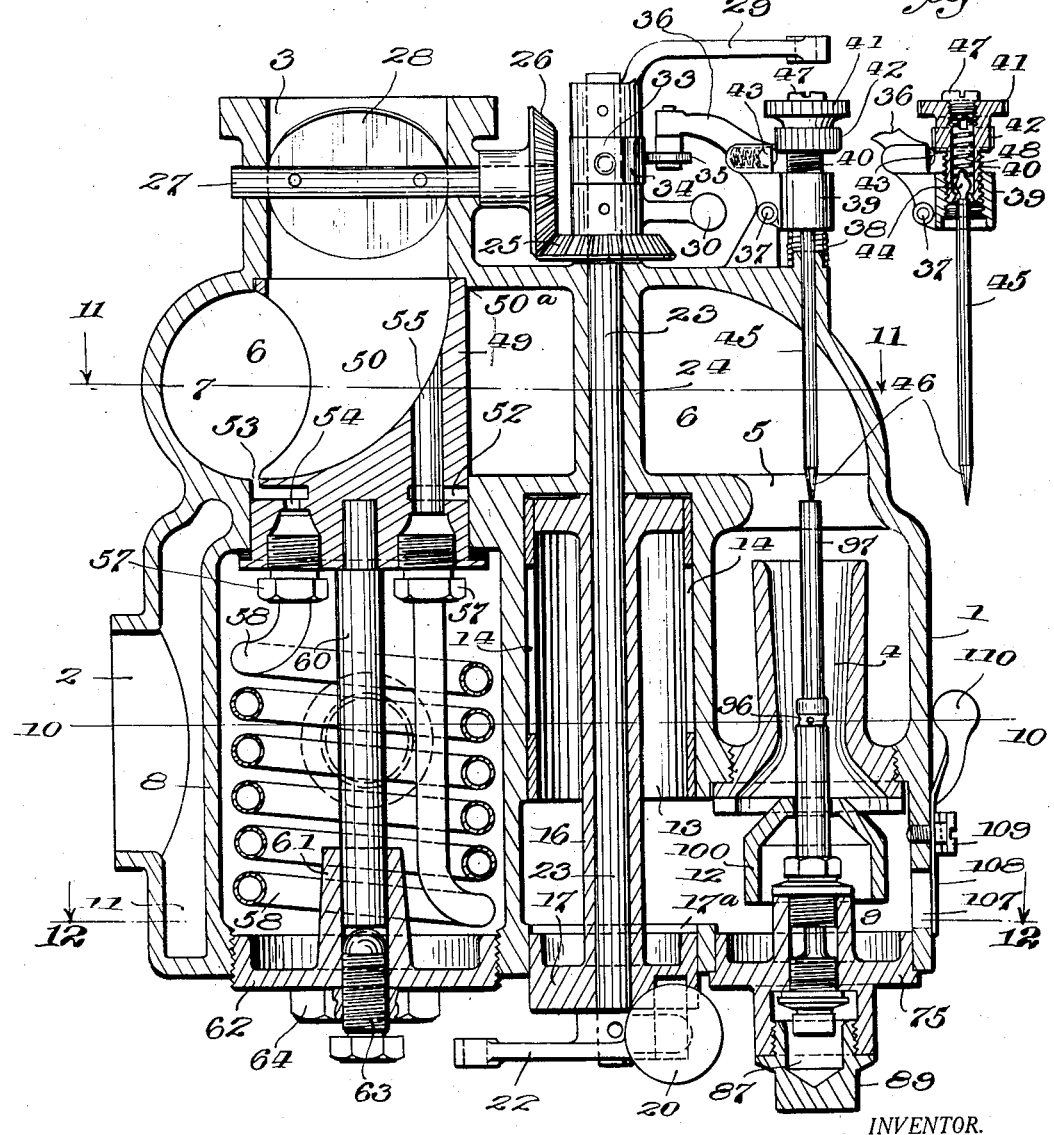

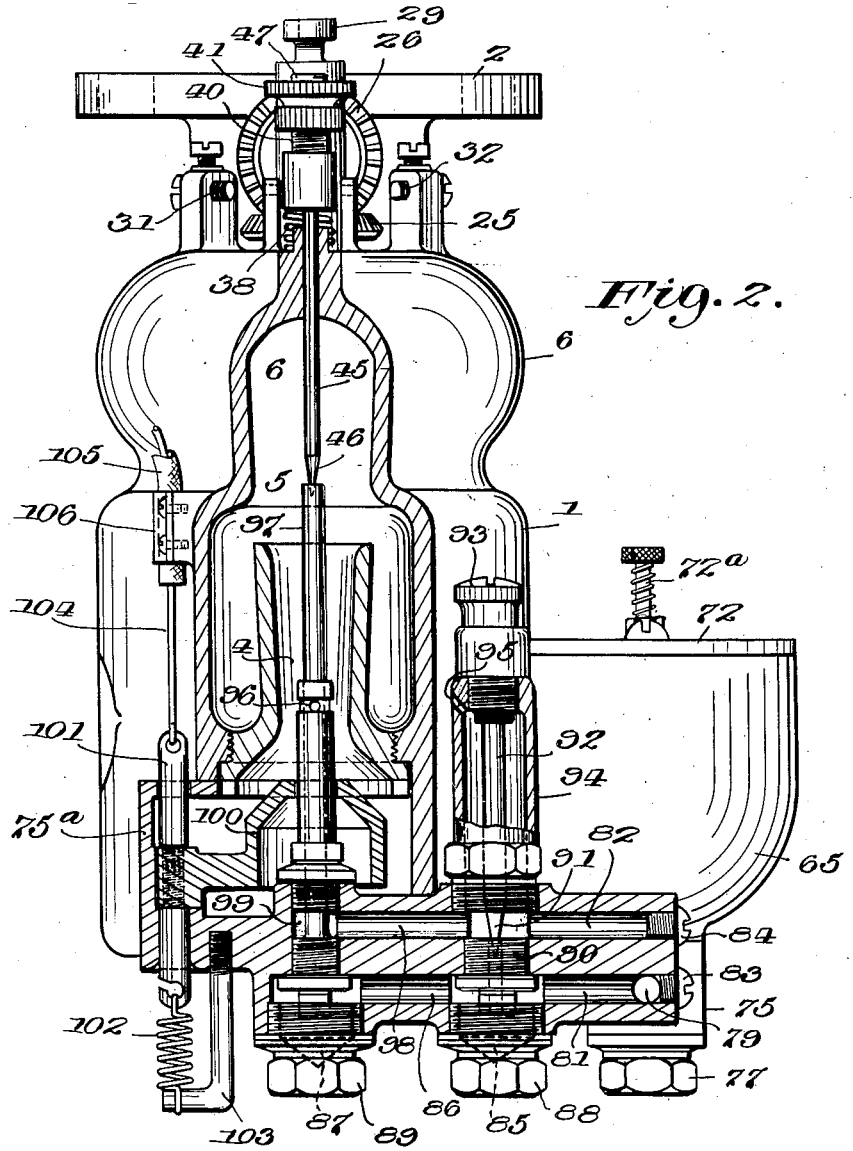

J. HUTCHINSON

LIQUID FUEL VAPORIZER

Filed March 17, 1925 6 Sheets-Sheet 3

INVENTOR.
Job Hutchinson,
BY Prentiss, Stone & Boyden,
ATTORNEYS.

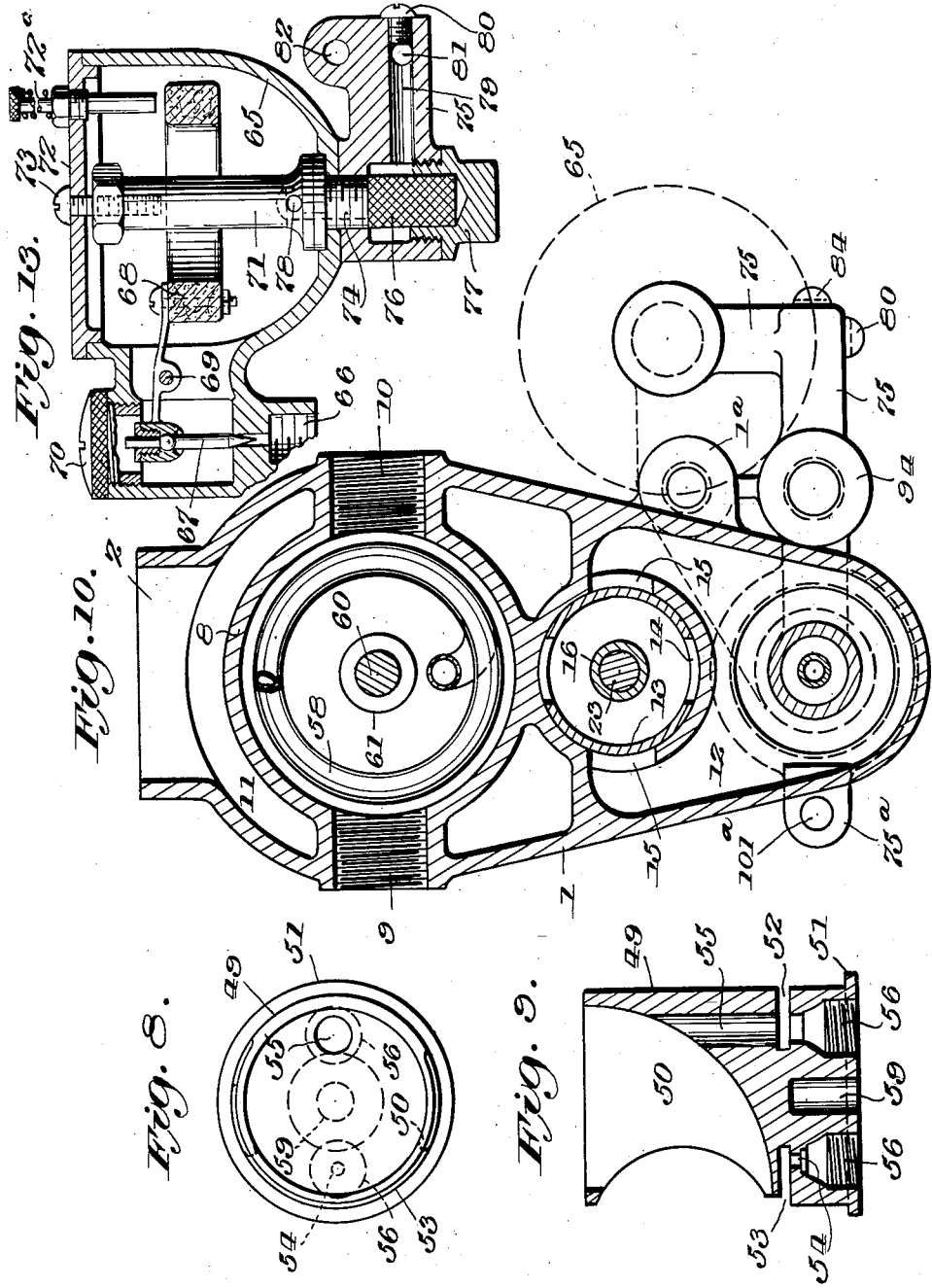

April 12, 1927.

J. HUTCHINSON

LIQUID FUEL VAPORIZER

Filed March 17, 1925  6 Sheets-Sheet 5

1,624,249

INVENTOR.
Job Hutchinson,
BY
Prentiss, Stone & Boyden,
ATTORNEYS.

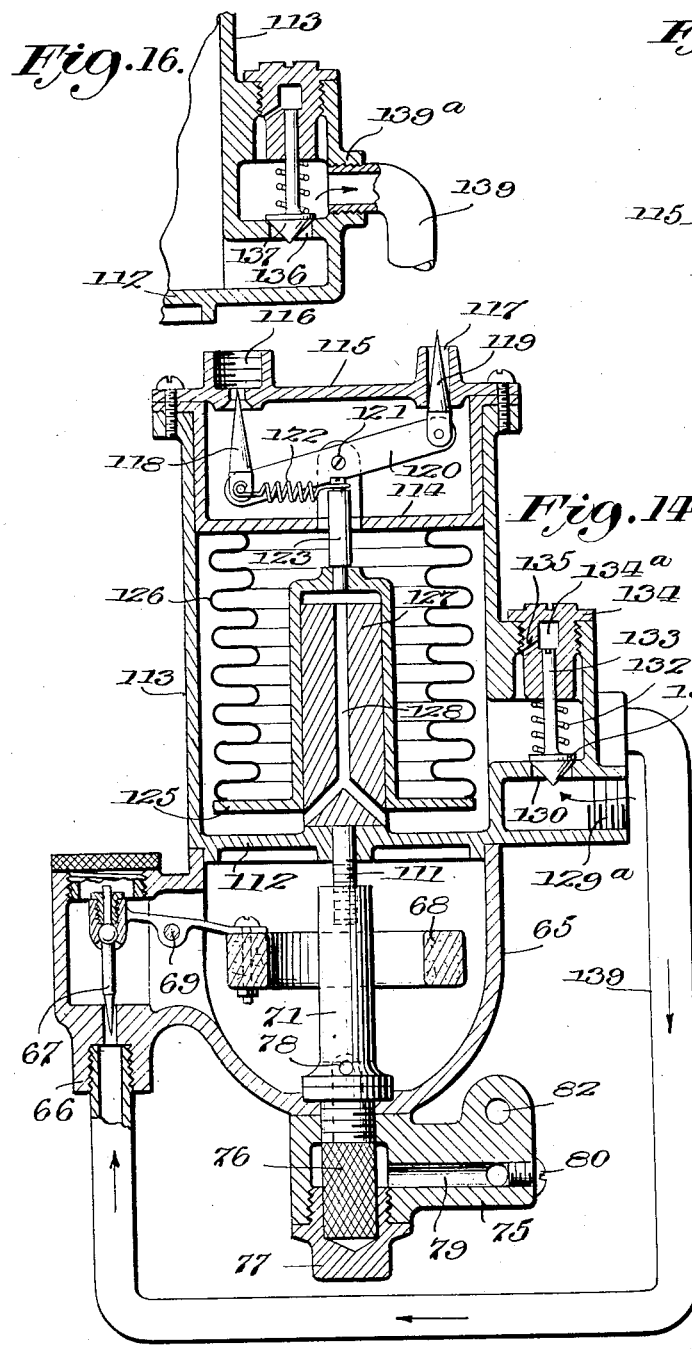

Patented Apr. 12, 1927.

1,624,249

UNITED STATES PATENT OFFICE.

JOB HUTCHINSON, OF SAUGERTIES, NEW YORK.

LIQUID-FUEL VAPORIZER.

Application filed March 17, 1925. Serial No. 16,232.

This invention relates to means for supplying fuel to internal combustion engines, and especially to means capable of utilizing and completely vaporizing all portions of the liquid fuel supplied by the carbureter.

In a co-pending application, Serial No. 679,431, filed December 8, 1923, I have shown a combined pump, carbureter and vaporizer, constructed as a unit and adapted to be attached to the intake manifold of an engine. The present invention is in the nature of a further development of and improvement upon the structure described in the above mentioned application.

The apparatus disclosed in the present application comprises, as in the former case, a combined pump, carbureter and vaporizer, these three elements, together with the necessary controlling valves, being embodied in a single, unitary structure adapted for direct attachment to an internal combustion engine and to a fuel tank.

While I will illustrate and describe, in the present application, the details of all of the elements entering into my improved construction, the claims will be directed to the heating and vaporizing features and to such other elements as closely cooperate therewith, the specific structures of the pump and of the carbureter themselve being reserved to form the basis of divisional applications.

One of the objects of the present invention is to provide improved means for separating from the gaseous charge on its way to the engine, any particles of liquid which it may contain, and for vaporizing such liquid and delivering the same to the engine.

Specifically, the invention seeks to provide an improved vaporizing coil, so located that the liquid particles separated from the charge will flow by gravity into one end of it, and so arranged that the vaporized products will be delivered from the other end thereof, thus causing a circulation of the fuel through the coil. A still further specific object is to provide an improved vaporizing coil, so constructed that it may be readily removed from the main casing for cleaning and the like. Other objects of the invention are to provide improved means for separating the liquid particles from the charge, on its way to the engine, by centrifugal force, without the use of any moving parts, and to so dispose the vaporizing coil that it is heated by the same means which heats the air intake, and that, while this heating means is formed as an integral part of the main casing containing the carbureter and separating chamber, it is spaced from these elements sufficiently far to avoid danger of overheating them.

With the above and other objects in view, as will hereinafter appear, the invention consists in the construction and combination of parts hereinafter described and claimed, and illustrated in the accompanying drawings, in which:—

Fig. 1 is a vertical central section through my improved fuel supplying device, including carbureter, separator and vaporizer;

Fig. 1ª is a detail of a portion of the mechanism illustrated in Figure 1, parts being shown in vertical section;

Fig. 2 is a vertical transverse section through the carbureter part of my improved device, such section being taken in a plane at right angles to that of Figure 1;

Fig. 3 is a side elevation of one of the castings going to make up the complete structure illustrated in the preceding two figures;

Fig. 8 is a plan view of the terminal block of my improved vaporizing coil;

Fig. 9 is a central vertical section through the same;

Fig. 10 is a horizontal section substantially on the line 10—10 of Figure 1;

Figure 11:
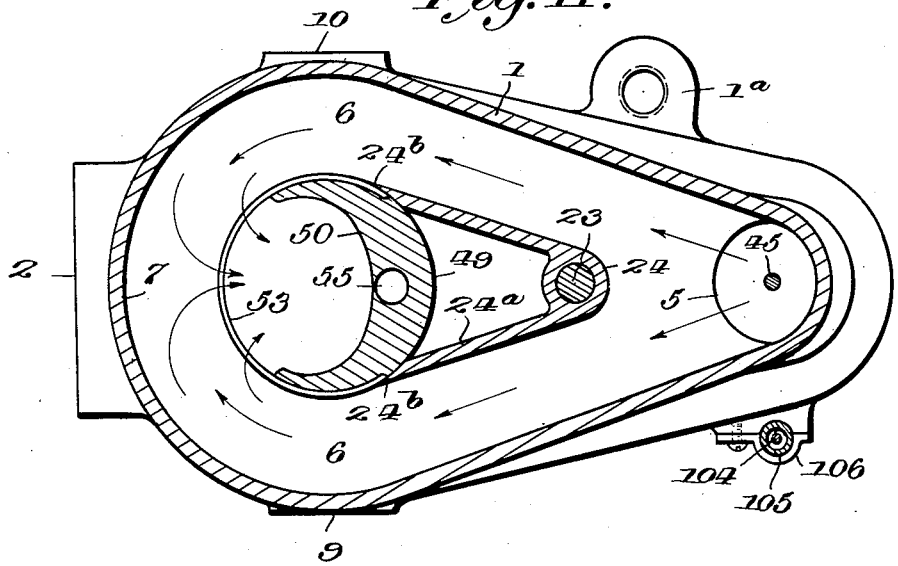
Figure 12:
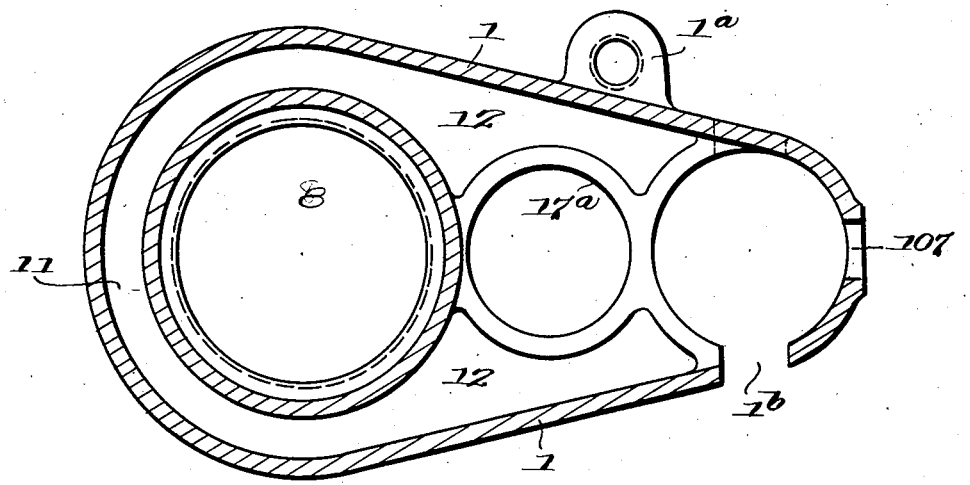

Figs. 11 and 12 are similar sections substantially on the lines 11—11 and 12—12 of Figure 1;

Fig. 13 is a vertical central section through the carbureter and associated parts, when the pump is not employed;

Fig. 14 is a similar view illustrating my improved suction operated pump and the manner in which it is mounted on the fuel reservoir of the carbureter;

Fig. 15 is a plan view thereof;

Fig. 16 is a vertical fragmentary section on the line 16—16 of Figure 15; and

Fig. 17 is a sectional elevation on the line 17—17 of Figure 15, looking in the direction of the arrows.

Referring to the drawings in detail, my improved fuel supplying device, in its entirety, comprises a main casing 1, which, for the most part, consists of a single casting. At one end of this casing is an air intake 2, and at the top is a conduit or connection 3 for attachment to the intake manifold of an engine.

Figure 4:
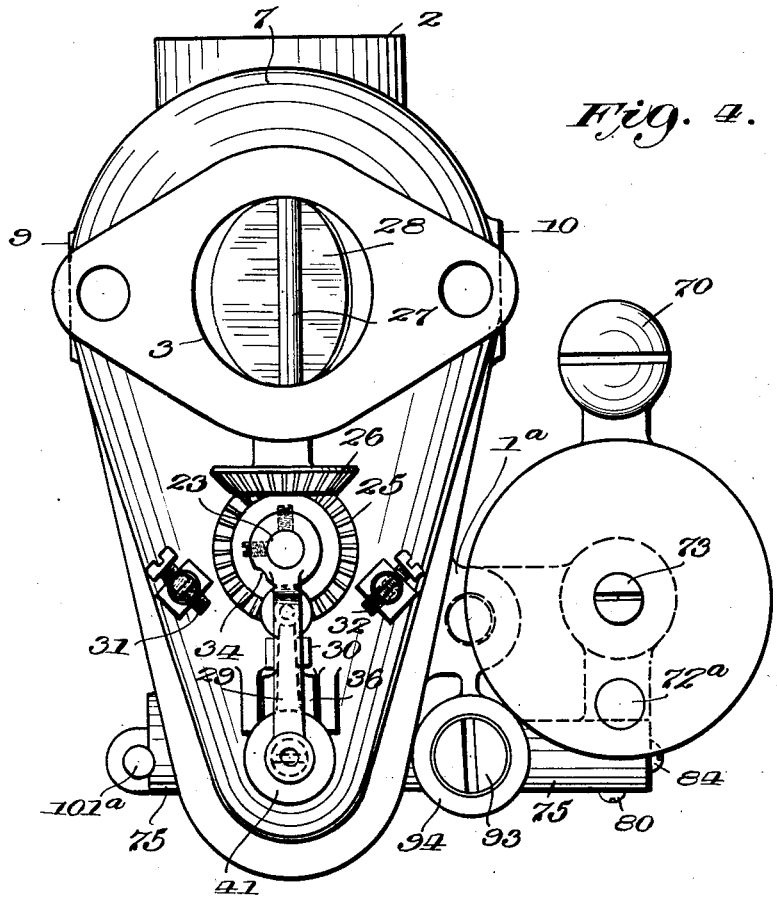
Fig. 4 is a plan view of my improved fuel supplying device complete.
Figure 6:
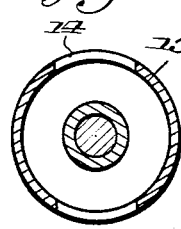
Fig. 6 is a section on the line 6—6 of Figure 5.

The carbureter comprises what I term a primary venturi 4, and a secondary venturi 5, arranged in series and both discharging into a horizontally extending, elongated mixing and separating chamber 6, the shape of which is perhaps best shown in Figure 11. The walls of this chamber are preferably rounded vertically, as shown in Figures 1 and 2, and also that end of the chamber opposite the venturi 5 is of substantially semi-circular shape horizontally, as shown in Figures 4 and 11.

Arranged in the casing 1 below the separating chamber 6, just described, is a heating chamber 8, preferably cylindrical in form, and having diametrically opposite ports 9 and 10, adapted to receive pipes forming part of the exhaust line from the engine.

Between the walls of the heating chamber 8, and the walls of the casing, is formed an annular chamber 11, through which the incoming air flows, thus coming in contact with the heated walls of the chamber 8 and becoming warmed. The chamber 11 communicates with a chamber 12, which extends underneath the venturis above described, and serves to conduct the heated air to them.

Figure 5:
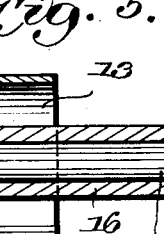
Fig. 5 is a detail illustrating the auxiliary air valve and adjusting means therefore, parts being in section.
Figure 7:
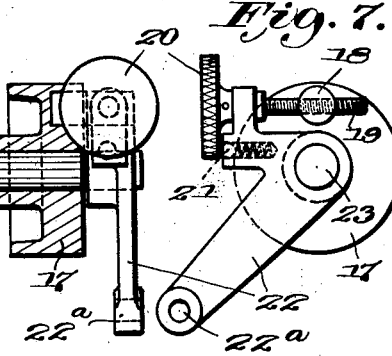
Fig. 7 is an end elevation of the mechanism shown in Figure 5.

Interposed between the chamber 12 and the venturi 5 is an auxiliary air valve shown as a vertically extending cylindrical shell 13, having diametrically disposed ports 14, which ports register with similar ports 15, formed in the cylindrical housing in which the valve is mounted. The valve 13 is secured to a central tubular shaft or sleeve 16, which extends downwardly through an opening 17ª, in the bottom wall of the casing 1, and carries at its lower end a disk 17, which is mounted to rotate in such opening. As best shown in Figures 5 and 7, a pin 18 is set into the outer face of the disk 17, and through this pin extends a screw 19, having at one end a knurled disk 20, associated with a spring pressed detent 21, for preventing accidental turning. The screw 19 is swiveled near the disk 20, in one arm of a bell crank lever 22, which is fixed to the lower end of a shaft 23, extending loosely through the sleeve 16 and up through the top of the casing 1. The other arm of the lever 22 is formed at its end for attachment to the hand or foot lever for controlling the speed of the engine.

Where the shaft 23 passes up through the separating chamber 6, it is encased in a fixed sleeve or bushing 24. Just above the top of the casing 1, a beveled gear 25 is secured to the shaft 23, and this meshes with a similar beveled gear 26, secured to a shaft 27, carrying the usual butterfly throttle valve 28. To the upper end of the shaft 23 is secured a lever or arm 29, to the end of which may be attached a manual or foot control. It may be here pointed out that there are thus provided two levers 22 and 29, both attached to the shaft 23. The manual control can be connected to one of these levers and the foot control to the other.

Secured to the shaft 23 between the gear 25 and arm 29, is a stop arm 30, which is arranged to engage adjustable stop screws 31 and 32, and thus limit the movement of the shaft 23 and associated parts. It will be understood that by virtue of the screw 19, shown in Figure 7, the angular position of the valve 13, relative to the shaft 23, can be adjusted as desired, so that the time of opening of the auxiliary air valve may be regulated.

Also secured to the shaft 23 between the gear 25 and arm 29 is a collar 33, having a notch or depression 34 at one point in the periphery thereof. A roller 35 is arranged to bear against the periphery of the collar 33, and to ride into and out of the groove or notch 34. This roller is carried by an arm 36, pivoted at 37 to a fixed bracket and having a hollow threaded boss 39, under which is seated a compression spring 38. This spring tends to turn the lever 36 and associated parts about its pivot 37, in a counterclockwise direction, thus urging the roller 35 against the collar 33.

Mounted within the hollow threaded boss 39 is a hollow plug 40, provided at its upper end with a knurled disk or knob 41, and with a ratchet wheel 42, the latter arranged to engage a spring detent 43, so that it is held against accidental displacement. Mounted in the lower end of the hollow plug 40, preferably by means of a ball and socket joint 44, is the upper end of a needle valve 45, the lower pointed end 46 of which extends down into the center of the venturi 5 and is adapted to control the flow of fuel through a nozzle 97, hereinafter described. Bearing down on the ball shaped head 44 of the valve stem 45, inside the plug 40, is a compression spring 48, the tension of which may be regulated by means of a screw 47 set into the upper end of the plug 40. From the above description, it will be seen that normally, the needle valve 46 more or less blocks or closes the upper end of nozzle 97, but when the shaft 23 is so turned as to permit the roller 35 to drop into the notch or groove 34, then the spring 38 swings the valve upwardly, causing it to obstruct the nozzle 97 to a less extent, or, in other words, opening the nozzle wider. The ball shaped head 44 permits the bracket 36 to swing about its pivot 37, while the needle valve partakes of a vertical rectilinear movement.

Set into the separating chamber 6 and disposed concentrically with the arc-shaped portion 7 thereof, is a cylindrical terminal block 49, to which the heating coil is attached. This terminal block projects up through an opening in the bottom of the chamber 6, and extends throughout the height of such chamber, its upper end being received in a recess in the top wall of the chamber 6, as indicated at 50ª. Around the lower end of the block 49 is formed a radial flange 51, adapted to fit against the edge of the opening above referred to, and form a tight seal. Referring to Figure 11, it will be seen that the fixed sleeve or bushing 24 is provided with a pair of integrally formed wings 24ª extending toward the block 49 and becoming tangent to the periphery thereof, as indicated at 24ᵇ, the wings 24ª lying substantially parallel with the side walls of the chamber 6.

The side of the terminal block opposite the wings 24ª, is cut away, as clearly shown at 50 in Figures 1 and 9, to form a conduit extending from the chamber 6 to the engine connection 3. Preferably this cutting away is done on a smooth curve, as illustrated. A groove 52 is milled around the lower part of the block 49, and the edge of the block is cut away on one side, as indicated at 53, so as to form a crevice or arc shaped grooved connecting the annular groove 52 with the lowest point of the chamber 6 adjacent the curved wall 7 thereof. Communicating with the groove 52, from below, is a port 54, opening into a socket 56. A similar socket 56 is formed at a diametrically opposite point in the bottom of the block 49, and a port 55 extends from such socket vertically up through the block, opening into the cut away portion 50 thereof, at a point considerably above the port 54. It will also be noted that this port 55 is preferably a good deal larger than the port 54.

Secured in the sockets 56 by means of threaded bushings 57 or the like are the two ends of a heating coil 58. This coil is preferably of helical shape, and is so proportioned as to fit freely within the heating chamber 8.

In between the sockets 56 is a central socket 59, adapted to receive the upper end of a post 60, the lower end of which fits freely within a socket 61, carried by a removable cap or cover 62, which is threaded into an opening in the bottom of the heating chamber 8, and is of such size as to permit the heating coil and terminal block as a unit, to be withdrawn downwardly through the opening when the cover or cap 62 is removed. A set screw 63 is mounted in the center of the cap or cover 62, and bears against the lower end of the post 60, thus forcing the terminal block tightly upward into position, the screw being held against accidental displacement by means of a lock nut 64. It will be particularly noted that the vaporizing coil and terminal block constitute a unitary structure which can be withdrawn as a whole, when the cover 62 is removed, without dismantling. It will also be observed that owing to the larger size of the port 55, and to its position nearer the engine intake, the suction of the engine will tend to cause a circulation of fuel through the vaporizing coil 58, causing the fuel to be drawn into the port 54 and, after passing through the coil, causing it to be discharged from the port 55.

I will now proceed to described the carbureter and associated parts illustrated in the drawings and forming a part of my invention, but reserved for a divisional application. The carbureter comprises a fuel reservoir 65, having a fuel inlet 66 controlled by a needle valve 67, operated by the usual float 68, pivoted at 69. The valve chamber is closed by a plug 70. Extending up centrally from the bottom of the fuel reservoir 65 is a post 71, and a top or cover 72 for the fuel tank is held in position by a screw 73 passing downwardly into this post. The usual float test plunger 72ª may, if desired, be employed.

At the lower end of the post 71 is a hollow screw-threaded shank 74, which projects down through the bottom of the reservoir 65, and is set into an opening in the upper face of a casting 75. Beneath this opening, the casting is bored out to provide a chamber in which a filter 76, of fine wire mesh or the like, is placed, this being held in position by a plug 77. At the bottom of the post 71 is a port 78, communicating with the interior of the hollow threaded shank 74 and serving to conduct the fuel from the reservoir through the strainer.

Communicating ports or passages 79 and 81 are bored in the casting 75, the ends of these passages being closed by screws 80 and 83. Another passage 82, parallel with and above the passage 81, is also bored in the casting 75, its end being closed by a screw 84.

It will be understood that this casting 75, the outline of which, in plan, is shown in Figures 4 and 10, and a side elevation of which is shown in Figure 3, carries the fuel reservoir 65 and is, itself, secured to the main casing 1 by means of a suitable lug 1ª. The casting 75 extends transversely across and under one end of the main casting 1, the end of it fitting into a notch or recess 1ᵇ, formed in the lower portion of the main casting, (see Figure 12). Figure 2 shows a section taken longitudinally through this casting 75, and illustrates how it is disposed immediately under the venturis 4 and 5, heretofore mentioned.

Referring to Figures 1 and 2, it will be seen that the casting 75 is provided with two relatively large vertical bores, the lower ends of which are closed by screw threaded plugs 88 and 89. The interior of these plugs are hollowed out, as best shown in Figure 1, to form wells 85 and 87, respectively, and a passage 86 connects these two wells. Above the plug 88 and also above the passages 81 and 86, is set a plug 90 having a port extending therethrough, which port is controlled by means of the pointed end 91 of a needle valve 92, carried by a plug 93, threaded into the upper end of an auxiliary reservoir or chamber 94. A small bleed port 95, establishes communication between the upper end of the chamber or reservoir 94 and the outside atmosphere.

Extending upwardly from the well 87 are two concentric tubes constituting a primary nozzle 96 and a secondary nozzle 97, in which, of course, the liquid fuel stands at the same level. The secondary nozzle 97 is supplied directly from the well 87, while the primary nozzle 96 communicates with a chamber 99 formed between two plugs screwed into the bore above the plug 89, which chamber is supplied with fuel through a passage 98, forming in extension of the passage 82 and communicating with the auxiliary reservoir 94 and with the well 85 through the port controlled by the needle valve 91.

It will be understood that when the engine is idle, the auxiliary reservoir 94 fills with fuel up to the level of that in the main reservoir 65, and then, when the throttle is opened and the engine started, fuel is drawn up through the primary nozzle 96 and venturi 4, the accumulated fuel in the auxiliary reservoir 94 flowing freely out through the passage 98 to supply the extra demand required at starting. Subsequently, when this auxiliary supply of fuel has been used up, the engine continues to draw fuel through the primary nozzle 96, such fuel then being supplied from the well 85 and controlled by the needle valve 91. This provides an extra supply of fuel for enriching the mixture at starting.

In order to still further enrich the starting mixture or, as it is commonly called, to prime the engine, a choke valve 100 is provided. This is of frusto-conical shape, and is adapted to fit up within a similarly shaped cavity at the bottom of the venturi 4, around the nozzle 96. It is obvious that when this choke valve is moved up into engagement with the venturi, that practically nothing but liquid fuel will be drawn from the nozzle 96.

The choke valve 100 is secured to a rod 101, which is mounted to slide vertically through openings 101ª, formed in an extension 75ª of the casting 75, as best shown in Figures 2 and 3. The rod and throttle valve are resiliently held down by means of a spring 102, secured at one end to the rod and at the other end to an angle pin 103, set into the casing 1. The choke may be lifted into operative position by means of a pull wire 104, attached to the upper end of the rod and passing through a flexible tube 105, to the dash, this tube being held in a suitable clamp 106, (see Figures 2 and 11).

In order that cold air may be admitted to the air chamber 12, if desired, a port 107 (see Fig. 1) is provided adjacent the choke 100, and is controlled by means of a swinging valve 108, mounted on a screw 109 and provided with a thumb piece 110, by means of which it may be manually operated. The operation of the device, as so far described, will be now briefly explained. Much has already been said of the manner in which the auxiliary reservoir 94 supplies an extra amount of fuel at starting. After the engine has begun to run normally, its speed may, of course, be varied as usual by rotating the shaft 23 through either the levers 22 or 29, thus opening the throttle 28 to a greater or lesser extent. After the shaft 23 has been rotated to a certain extent, however, the ports 14, 15 of the auxiliary air valve will begin to register, thus admitting air from the chamber 12 into and through the auxiliary venturi 5. When the velocity of air through this venturi becomes sufficiently great, fuel will be drawn up through the auxiliary nozzle 97, and will thus serve to enrich the mixture as the throttle is opened wider and wider. Finally, just before the throttle reaches its full wide open position, the roller 35 drops into the groove or notch 34, thus withdrawing the needle valve 46 from the nozzle 97, and providing a freer outlet for fuel from this nozzle. This has the effect of still further enriching the mixture, and is useful in providing an abnormally strong mixture for peak loads or for emergency, as in pulling out of a rut or up an exceptionally steep hill.

It will be understood that the gaseous mixture, coming up from either the main or auxiliary venturis, or both, passes into the chamber 6, whence it flows toward the left, as indicated by the arrows in Fig. 11. The flow divides, a part passing on one side of the housing 24, and part on the other, this housing and the associated wings 24ª constituting a baffle, serving to direct the flow of the gaseous mixture. It will be further observed that the currents passing on opposite sides of the terminal block 49, sweep around this terminal block and the circular part of the chamber 6 at high velocity, and are thus subjected to the action of centrifugal force. The two streams or currents of gas and vapor meet at the center of the curved portion 7 of the chamber 6 and this impact serves to produce a complete mixing or mingling of the air and fuel. The gaseous charge then flows from this point up through the cut away portion 50 of the terminal block 49, past the throttle 28 and into the engine.

Any particles of liquid contained in the gaseous streams or currents passing along the sides of the chamber 6, as above described, are thrown by the centrifugal force, as explained, against the curved wall 7 of the chamber 6. The liquid particles accumulate on this wall and trickle down the same, flowing by gravity through the crevice or groove 53, into the port 54 and thence into the vaporizing coil 58, where the liquid is vaporized. The vapor then passes on through the coil 58 and is discharged from the upper end of the port 55, where it mingles with the gaseous stream flowing upwardly to the engine. It will thus be seen that I have provided an exceedingly simple and efficient device for separating the liquid particles from the charge and for vaporizing them and returning the vapor to the separating and mixing chamber, and it will be further observed that the same means which I employ to separate the particles of liquid serves also to produce a thorough co-mingling of the gaseous streams forming the charge.

While in Figure 13 and the related figures, I have shown a carbureter comprising a fuel reservoir having the usual top or cover 72, and adapted to receive its fuel supply from any suitable source, I contemplate, in practice, and in the preferred form of my invention, providing a suction operated fuel pump for delivering fuel from a tank or the like to the fuel reservoir of the carbureter. Referring now to Figures 14 to 17, I have illustrated such a pump and have designated it in its entirety by the numeral 113. From an inspection of Figure 14, it will be seen that I propose to mount this pump on top of the fuel reservoir 65, in place of the cover 72 shown in the preceding figures. To this end, the bottom 112 of the pump chamber is provided at its center with a threaded pin 111, adapted to be screwed into a similarly threaded socket in the upper end of the post 71. Across the upper part of the pump chamber 113, which is preferably cylindrical, extends a partition 114, and the top of the chamber is closed by a cover 115. This is provided with a port having a fitting 116 for connection with the intake manifold of the engine, and with a port 117, communicating with the atmosphere. These ports are controlled respectively by tapered plug valves 118 and 119, pivotally mounted at the ends of an oscillating lever 120, pivoted at its center to a fixed support, as indicated at 121. Secured to one end of this lever is one end of a tension spring 122, the other end of which is secured to the upper end of a pin or post 123, rigidly mounted upon a sleeve 124, having a radial flange 125 at its lower end. Between this radial flange and the partition wall 114, extends a metal bellows of the sylphon type, secured at its ends to the flange and partition respectively. The sleeve 124 is constructed to reciprocate freely over a fixed column 127, having a somewhat restricted port 128, extending up vertically therethrough, and communicating at its lower end with the interior of the pump chamber.

From the pump chamber extend inlet and outlet passage ways, the former comprising a socket 129$^a$ adapted to receive an inlet pipe 129 extending from a tank, and the latter comprising a socket 139$^a$ adapted to receive an outlet pipe 139, the other end of which is connected to the fuel inlet 66, of the carbureter, as shown in Figure 14. Between the pipe 129 and pump chamber is a port 130, controlled by a check valve 131, held to its seat by a spring 132, interposed between such valve and a plug 134, such plug being bored to receive the valve stem 133, and having above such valve stem a chamber or pocket 134$^a$, vented by means of a small port 135.

Between the pipe 139 and the pump chamber 113 is a port 136, controlled by a check valve 137, similarly constructed. This valve has a stem working in a plug 138 similar to the plug 134, and the whole arrangement is symmetrical, as shown, so that both check valves open upwardly. The operation of this pumping device is quite similar to that of the pump described in my prior copending application, above identified. The socket 116 being connected with the intake manifold of the engine, the suction tends to produce a partial vacuum within the pump chamber above the partition 114, and inside of the bellows 126, there being a space around the post 123, which establishes communication with the interior of the bellows. This partial vacuum tends to cause the bellows to collapse, and this draws the sleeve 124 upwardly, sucking fuel into the pump chamber through the inlet valve 131. After the sleeve 124 has risen a predetermined amount, the post 123 carries the end of spring 122 up above the pivotal point 121 of the lever 120, and this over-center movement causes the lever to snap to its reverse position, thus forcing valve 118 into its port to close the same, and withdrawing valve 119 from its port to open the same. The suction is thus shut off and atmospheric air is admitted to the bellows, which thereupon opens out again, thus expelling the contained liquid from the pump chamber through the outlet valve 137 and thence through the pipe line 139, into the carbureter. The restricted passage 128, in combination with the sleeve 124, acts as a dash pot to retard and steady the movement of the pump. The pump therefore, serves to produce a constant pressure tending to force fuel up through the needle valve 67 of the carbureter, and if this pressure tends to become too great, the operation of the pump ceases, since the engine suction is not sufficiently strong to actuate it.

It will thus be seen that I have provided a combined carbureter and pump of exceedingly simple construction, and with but few moving parts, and it is thought that the many advantages of this part of my invention will be readily appreciated without further discussion.

What I claim is:—

1. The combination with a carbureter, of a horizontally extending chamber communicating therewith and having an outlet at the highest point thereof, a vaporizing tube, centrifugal means whereby any vaporized liquid fuel in the gaseous mixture flowing through said chamber from the carbureter to said outlet is separated from such mixture, and means whereby the liquid fuel so separated is caused to enter one end of said vaporizing tube, be vaporized thereby, and delivered from the other end of said tube directly into said chamber.

2. In a device of the class described, the combination with a carbureter, of a separating and mixing chamber communicating therewith and with the engine intake, the bottom of said chamber having one point lower than the rest, and a vaporizing pipe having one end connected with the said low point through a relatively restricted opening, and the other end also communicating with said chamber but through a larger opening, whereby suction of the engine causes a circulation through said pipe.

3. The combination with an internal combustion engine, of an attachment therefor comprising a carbureter, a horizontally extending chamber communicating therewith at one end, and with the engine intake at the other end whereby a constant flow of gaseous fuel mixture is set up through said chamber, said engine intake opening upwardly therefrom from the highest point thereof, the walls of said chamber being so shaped as to cause the gaseous mixture from the carbureter to flow in a horizontally curved path, whereby any liquid particles are separated therefrom by centrifugal force and thrown against the outer walls of said chamber, and a vaporizing device located directly below said chamber beneath the engine intake, and communicating with the lowest point of the chamber, whereby any separated liquid, accumulating at the bottom of said chamber, flows by gravity downwardly into said device, while the gas passes upwardly through the engine intake.

4. In a device of the class described, the combination with a carbureter, of a separating and mixing chamber communicating therewith and with the engine intake, and a vaporizing device comprising a coiled pipe disposed below said mixing and separating chamber and having one end communicating with the lowest point of said chamber, and the other end also communicating with said chamber at a point above the first.

5. In a device of the class described, the combination with a carbureter, of a separating and mixing chamber communicating therewith and with the engine intake, the bottom of said chamber having a low point toward which the walls slope and a vaporizing device comprising a coiled pipe disposed below said mixing and separating chamber and having at one end a restricted opening, tapping the said low point, and having its other end also communicating with said chamber, but through a larger opening.

6. In a device of the class described, the combination with a carbureter, of a separating and mixing chamber communicating therewith and with the engine intake, and a vaporizing device comprising a coiled pipe disposed below said mixing and separating chamber and having at one end a restricted opening, tapping the lowest point of said chamber, and having its other end also communicating with said chamber, but at a point above said opening and nearer the engine intake, whereby the suction will produce a circulation through said coiled pipe.

7. The combination with a carbureter and engine intake, of a chamber through which the gaseous mixture travels on its way from the carbureter to the engine intake, a vaporizing pipe coil communicating at both ends with said chamber, one end being more restricted than the other, and means whereby any unvaporized liquid fuel in said gaseous mixture is separated therefrom the restricted end of said coil, caused to pass into and through the same and back into said chamber in a vaporized condition.

8. In a device of the class described, the combination with a carbureter, of a separating and mixing chamber communicating therewith and with the engine intake, and a vaporizing device comprising a coiled pipe disposed below said mixing and separating chamber, and having both ends connected with a coil terminal block, said block having ports establishing communication between said coil ends and said chamber, and means for detachably securing said block in position, whereby said coil and block are removable as a unit.

9. The combination with a carbureter, of a separating and mixing chamber communicating therewith and with the engine intake, a heating chamber below said separating and mixing chamber, but having walls integral therewith, and a vaporizing device in said heating chamber and communicating with the lowest point of said separating and mixing chamber, one end of said heating chamber being provided with a detachable closure, through which said vaporizing device may be removed from the heating chamber, for cleaning.

10. The combination with a carbureter, of a separating and mixing chamber communicating therewith and with the engine intake, a heating chamber below said separating and mixing chamber, a vaporizing coil in said heating chamber, a terminal block in which the ends of said coil are set, said block having ports establishing communication between the ends of said coil and said separating and mixing chamber, and means for detachably retaining said block in position, the heating chamber being provided with an opening through which said coil and block may be removed as a unit.

11. The combination with a carbureter, of a horizontally extending separating and mixing chamber communicating therewith and with the engine intake, and having an opening in its bottom at a point immediately below the engine intake, a vaporizing device comprising coil and terminal block, said terminal block fitting in said opening and extending upwardly to said engine intake, the side of said terminal block toward the carbureter presenting an unbroken wall, and the opposite side being cut away to provide a conduit communicating with the engine intake.

12. The combination with a carbureter, of a horizontally extending separating and mixing chamber communicating therewith and with the engine intake, and having an opening in its bottom at a point immediately below the engine intake, a vaporizing device comprising coil and terminal block, said terminal block fitting in said opening and extending upwardly toward said engine intake, means on the side of said terminal block toward the carbureter constituting a baffle, extending the full height of the separating and mixing chamber, and the opposite side of the said block being recessed, said block having ports formed therein connecting the ends of said coil with said recessed portion.

13. The combination with a carbureter, of a horizontally extending separating and mixing chamber communicating at one end therewith, and communicating adjacent its other end with the engine intake, said last mentioned end having an arcuate wall, a cylindrical block extending vertically across said chamber and concentric with said arcuate wall, the space between said block and wall being in communication with the engine intake, whereby the gaseous mixture coming from said carbureter is caused to divide and flow around both sides of said block, being thus subjected to centrifugal action which tends to deposit on said arcuate wall any liquid particles which the mixture may contain, and a vaporizer carried by said block below said chamber, said vaporizer having an inlet arranged to receive the liquid which may trickle from said arcuate wall.

14. The combination with a carbureter, of a horizontally extending separating and mixing chamber communicating at one end therewith, and also communicating with the engine intake, the opposite end of said chamber having a substantially semicircular wall, means for causing the gaseous mixture coming from the carbureter to divide into two streams, flowing along opposite parts of said wall toward each other, uniting at the middle point thereof and then passing to the engine intake, thus subjecting the mixture to centrifugal action, and means for vaporizing and returning to said chamber any liquid particles thrown out of the mixture by such centrifugal action.

In testimony whereof I affix my signature.

JOB HUTCHINSON.

CERTIFICATE OF CORRECTION.

Patent No. 1,624,249.                                    Granted April 12, 1927, to

JOB HUTCHINSON.

It is hereby certified that error appears in the printed specification of the above numbered patent requiring correction as follows: Page 1, line 30, for the word "themselve" read "themselves", and line 85, for "therefore" read "therefor"; page 4, line 34, for the word "in" read "an"; page 6, line 29, claim 1, for "vaporized" read "unvaporized"; lines 57 and 58, claim 3, strike out the word "therefrom"; lines 117 and 118, claim 7, strike out the words and comma "the restricted end of said coil," and insert instead the word "and"; line 118, strike ou the word "and" and insert the words and comma "the restricted end of said coil,"; and that the said Letters Patent should be read with these corrections therein that the same may conform to the record of the case in the Patent Office.

Signed and sealed this 14th day of June, A. D. 1927.

Seal.
M. J. Moore,
Acting Commissioner of Patents.